United States Patent [19]

Herr

[11] 4,074,642
[45] Feb. 21, 1978

[54] SEWING MACHINE WITH PROGRAMMABLE MEMORY

[75] Inventor: John Addison Herr, Garwood, N.J.

[73] Assignee: The Singer Company, New York, N.Y.

[21] Appl. No.: 709,050

[22] Filed: July 27, 1976

[51] Int. Cl.² ............................................. D05B 3/02
[52] U.S. Cl. .................................. 112/158 E; 318/568
[58] Field of Search ...................... 112/121.11, 121.12, 112/158 E; 318/568; 307/101 F, 101 CM

[56] References Cited

U.S. PATENT DOCUMENTS

| | | | |
|---|---|---|---|
| 3,588,408 | 6/1971 | Beausoleil | 200/292 X |
| 3,725,760 | 4/1973 | Bailey | 318/568 |
| 3,750,186 | 7/1973 | Sakamoto | 318/568 X |
| 3,830,175 | 8/1974 | Levor | 112/121.12 |
| 3,872,808 | 3/1975 | Wurst | 112/121.11 X |
| 3,911,234 | 10/1975 | Kotaka | 317/101 F |
| 3,982,491 | 9/1976 | Herzer et al. | 112/121.12 |

*Primary Examiner*—Werner H. Schroeder
*Assistant Examiner*—Peter Nerbun
*Attorney, Agent, or Firm*—William V. Ebs; Edward L. Bell; Robert E. Smith

[57] ABSTRACT

This disclosure relates to electronically controlled sewing machines and in particular to the combination of such a machine with a re-programmable static memory with which an operator can program in input data representative of stitch position coordinates for selected patterns, which input data will be encoded into digital form, stored and decoded into input signals for initiating operation of the sewing machine stitch position actuating means to produce patterns corresponding to the operator selected pattern. The re-programmable memory can be located remote from the machine or can be built in as an integral part of the structure of the machine itself. The machine may also contain a static read-only-memory (ROM) having fixed patterns for operation of the machine with or without a re-programmable memory and includes switching means for disconnecting the read-only-memory when the reprogrammable memory is connected to the machine. More specifically the invention provides for a programmer by which the operator can physically draw a pattern design of the operator's own choosing and the programmer will generate input data for use by the machine for reproducing the drawn pattern design.

9 Claims, 8 Drawing Figures

SEWING MACHINE WITH PROGRAMMABLE MEMORY

BACKGROUND OF THE INVENTION

In recent times an electronically controlled sewing machine has been introduced into the market place and is generally of the type illustrated in U.S. Pat. No. 3,872,808, issued Mar. 25, 1975. In such a machine a static read-only-memory device is provided in which is stored stitch pattern coordinates for the needle positions and fabric feed positions for a selected number of stitch patterns. Upon selection of a pattern from a pattern display on a machine, the read-only-memory is addressed and information is released in accordance with timing pulses coordinated with the mechanism of the machine which signals are converted from digital to analog form and fed to an actuating mechanism for the needle position and the fabric feed position to reproduce the selected pattern. With such machines the number of patterns that can be selected is restricted in accordance with the capacity of the read-only-memory device and once the patterns are fed into such a memory they are locked therein. In other words, the machine does not possess the capability of reprogramming or selective programming by operator generated information.

Dynamic programming devices such as tape drives of the magnetic and punched varieties, for example, are not practical for use in sewing machines since they require relatively elaborate power supplies for their operation. Also, tape-type memories must be recorded and read sequentially, and therefore, the operator cannot select patterns at random or from different section of the memory at will. One such device applied to a sewing machine is illustrated in Japanese Patent Publication No. 15713/70, published on June 1, 1970. However, the machine disclosed in the Japanese patent only purports to provide needle control for production of geometric patterns and is not capable of producing non-geometric patterns which require both signals for the needle and the fabric feed. Further, a machine of this type has never been successfully introduced into the market place.

One solution to the problem of providing a re-programmble memory for a sewing machine has been proposed and disclosed in U.S. Pat. application Ser. No. 631,776, filed Nov. 13, 1975, by Herr et al and assigned to the same assignee as the present application. In this referenced application, a magnetizable material is utilized for the memory which can be selectively magnetized by the operator in accordance with pattern instructions. The magnetizable memory is then read by the machine to reproduce the pattern either by mechanical means or electronic means. Another solution to this problem has been proposed in copending U.S. Patent Application, "Sewing Machine With Programmable Memory", by D. J. Coughenour and J. A. Herr, filed concurrently herewith.

GENERAL DESCRIPTION OF INVENTION

The present application provides for a static type of re-programmable memory and sewing machine combination through which the operator can draw a pattern and simultaneously generate electrical signals which are then converted to digital signals and are put directly into a memory and no intermediate reading device is required to read the program from the memory and then convert the information read therefrom into digital information. In one embodiment of the present invention the re-programmable device is located remote from the sewing machine and is readily removable therefrom and the machine is capable of being operated by information from the re-programmable memory device when connected thereto or separately from a read-only-memory incorporated within the machine when the remote re-programmable memory is disconnected therefrom. When used herein, the term programmable memory preferably refers to a storage device of the static random access memory type (RAM) capable of being programmed upon introduction of programming instructions for temporary storage of such instruction and release therefrom upon proper address and includes a random access memory which may be programmed with all desired stitch coordinates capable of being reproduced by a sewing machine and when addressed with proper code information releasing the stitch coordinate information in accordance with the addressed code information.

Accordingly, it is an object of the invention to provide a novel electronically controlled sewing machine having a programmable device which can be programmed by the operator with stitch patterns of the operator's own choosing, if desired. It is also an object of the invention to provide a remote programmable memory device for use with the sewing machine for inputing electrical signals which can be converted to digital signals for input to the machine for controlling the stitch pattern instrumentalities of the machine. It is also an object of the invention to provide a programmable memory device through which the operator can visually indicate the desired pattern thereon and input into the memory device the appropriate digital data corresponding to the visually displayed pattern for providing control signals to the sewing instrumentalities of the sewing machine. Other objects and advantages of the invention will be best understood upon reading the following detailed description with the accompanying drawings.

DESCRIPTION OF THE DRAWINGS

In the accompanying drawings of preferred embodiments of the invention.

DESCRIPTION OF PREFERRED EMBODIMENT

Figure 1:
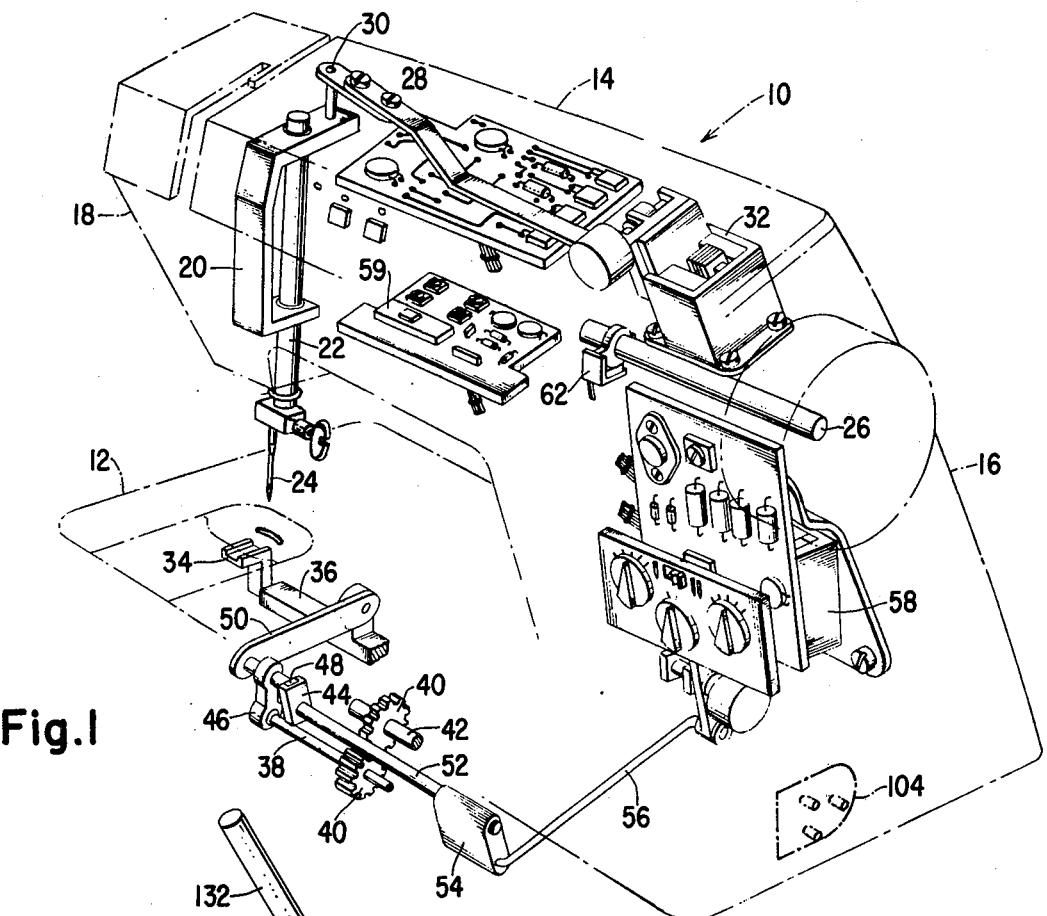
FIG. 1 is a perspective view of the sewing machine of the type used in combination of the present invention with the frame thereof showing in phantom and components thereof shown in elevation.

Referring to the drawings, in FIG. 1 there is shown a sewing machine casing 10 illustrated in phantom lines which sewing machine includes a bed 12, a bracket arm 14 and a standard 16 interconnecting bracket arm 14 with the bed 12 as illustrated. The bracket arm 14 terminates in a head portion 18 within which is supported in a conventional manner a needle bar gate 20 in which is supported for endwise reciprocation a needle bar 22 carrying at its lower end a needle 24. Endwise reciprocation is imparted to the needle bar 22 by an arm shaft 26 which is rotated by an electric motor (not shown) and connected to the needle bar by a conventional sewing machine mechanism (not shown) such as an eccentric mechanism to convert the rotary motion of the arm shaft 26 to reciprocating motion of the needle bar 22.

An actuating arm 28 is connected to the needle bar gate 20 at pivotal connection 30 to convert reciprocating motion of the actuating arm 28 imparted by a linear motion or actutor 32 into pivotal motion of the needle bar gate 20. The linear motor 32 of the reversible type and may be of the same type as fully described in U.S. Pat. Application Ser. No. 431,649, filed on Jan. 8, 1974, and assigned to the same assignee as the present invention. It will be seen therefore that the linear motor 32 may be used to determine the lateral position of the needle 24 as it penetrates the fabric disposed on the bed 12 to a place a thread therethrough at a particular stitch position coordinate.

In order to feed the fabric across the bed 12 in the usual manner, a feed dog 34 is disposed beneath the bed and is supported by a feed bar 36. Work transporting motion is imparted to the feed dog by means of a feed drive shaft 38 driven by gears 40 which in turn are driven by a bed shaft 42 connected to the machine arm shaft 26 in a timed relationship by a conventional mechanism (not shown). A cam 44 is connected to a pitman 46 through a slide block 48 which is disposed in a slot in the cam 44. The pitman 46 is also connected to a horizontal link 50 which in turn is pivotally connected to the feed bar 36 as shown. Thus for a given inclination of the cam 44, a predictable horizontal motion of the slide block will result which is transferred to the feed dog 34 by the horizontal link member 50 and the feed bar 36. The inclination of the cam 44 may be adjusted by rotation of regulator shaft 52 which is fixed to the cam 44. The regulator shaft 52 has a rock arm 54 fixed thereto at one end with the rock arm 54 having a rod 56 also connected thereto which in turn is connected to a second reversible linear motor or 58. Therefore, the linear motor 58 will be utilized to determine the feed rate of the sewing machine by determining the inclination of the cam 44.

Figure 3:
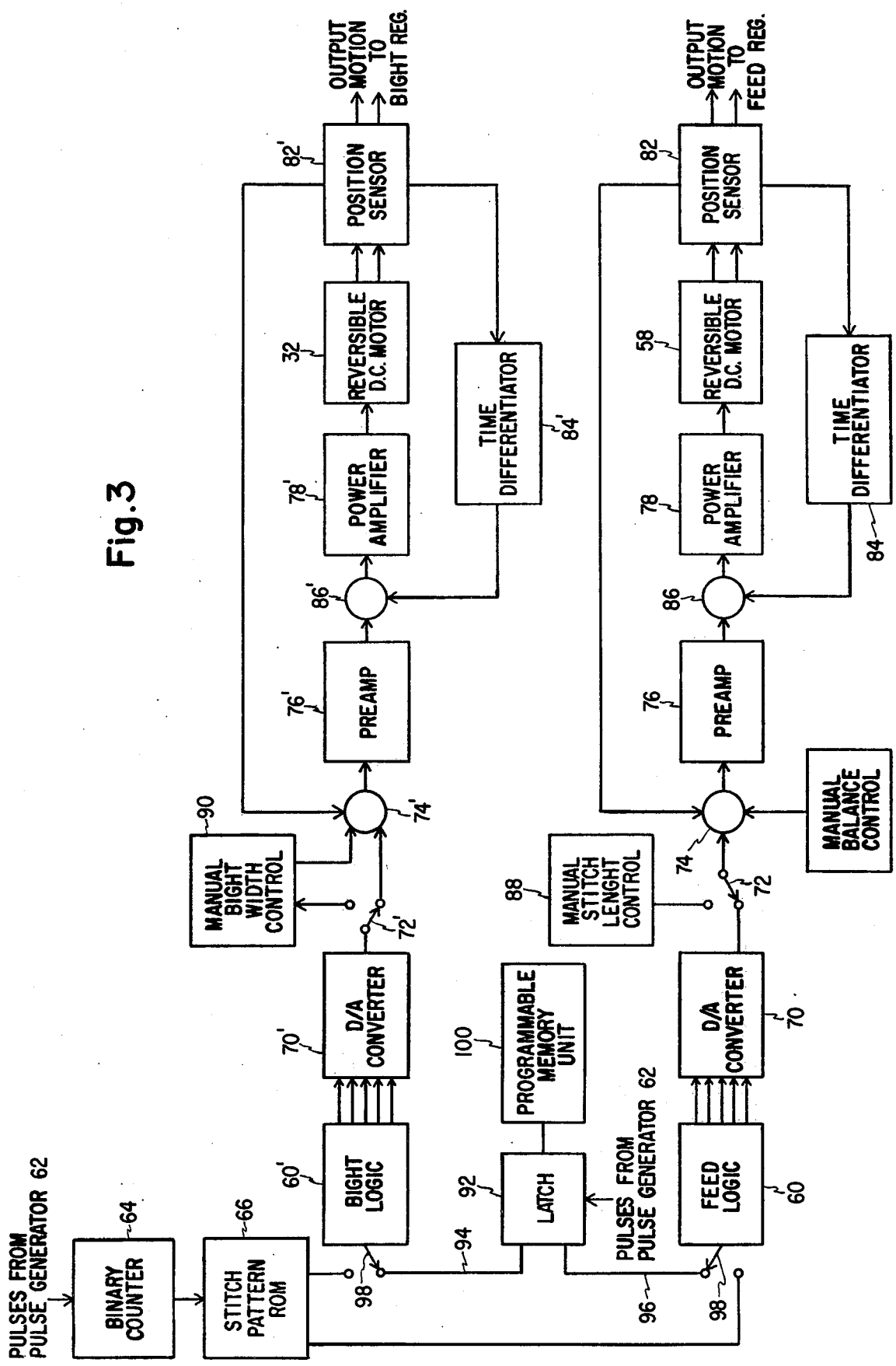
FIG. 3 is a general schematic block diagram of a system for adapting a static programmable memory unit to an existing machine having electronic stitch pattern controls.

Referring now to FIG. 3, the general schematic block diagram is shown therein for the bight and feed control of the sewing machine. The portions of the block diagram for bight and feed controls are substantially similar and it will suffice to describe the feed control only with similar numerals used for similar elements in the bight circuit except with the prime thereafter. The pattern information used for generating signals to drive the linear motors 32 and 58 preferably originates in a MOSFET Large Scale Integration (LSI) integrated circuit which is physically shown in FIG. 1 at 59 as a so-called Chip and may include a ROM, the bight logic and the feed logic portion of the electronic circuitry. A pulse generator 62 is supported on the main shaft 26 and is operative to generate pulses which are counted up in the binary counter 64 and presented as address inputs to the stitch pattern ROM 66 which is encoded to produce as output therefrom five bits of bight information and five bits of feed information as indicated as the output from the feed logic 60 and the bight logic 60'. The feed information is processed in the logic block 60 and may include a latch whereby the feed information may be held for later release to the feed servo system at a time appropriate to the operation of the feed mechanism. Similarly, the bight information is processed in logic block 60' and may include a latch whereby the bight information may be held for a later release to the bight servo system at a time appropriate to the operation of the needle jogging mechanism. As mentioned above, since the servo systems for the bight and for the feed are identical except for the specific switching necessary for manual over-ride and balance control in the feed regulating system, the following description will for convenience be confined to the feed system only.

The information processed by the feed logic block 60 is presented to the digital-to-analog converter 70, which may be a commercially obtainable unit such as the type known as the MOTOTOLA MC 1406 Unit. The converter 70 has an output which is a DC analog voltage representing a required feed position input. This line connects, in the automatic mode position of a switch 72, to a summing point 74 of a low level preamplifier 76 forming the first stage of a servo amplifier system. The switch 72 may comprise an FET switch. The preamplifier 76 drives a power amplifier 78 which supplies direct current of reversible polarity to the electromechanical actuator or linear motor 58, which in its broadest sense comprises a reversible motor, to position the actuator 58 in accordance with the input analog voltage from the converter 70. A feed back position sensor 82 mechanically connected to the actuator 58 provides a feedback position signal indicative of the existing output position. The input analog voltage and a feedback signal are algebraically summed at the summing point 86 to supply an error signal. The feedback signal from the position sensor 82 is also differentiated with respect to time in a differentiator 84 and the resulting rate signal is presented to the summing point 86 of the power amplifier 78 to modify the positional signal at that point. The position sensor 82 may be any device that generates an analog voltage proportional to position and may, in this embodiment, be a simple linear potentiometer connected to a stable reference voltage and functioning as a voltage divider. The differentiator 84 is preferably an operational amplifier connected to produce an output signal equal to the time rate of change of the input voltage, as is well known in this art.

While the actuators 32 and 58 may be conventional low-inertia rotary DC motor, it is preferable for the purpose of the present invention that they take the form of linear actuators in which a lightweight coil moves linearly in a constant flux field and is directly coupled to the load to be positioned. This simplifies the driving mechanical linkage and minimizes the load inertia of the system. A switch 72 shown in the automatic mode position in FIG. 3 may be operated from the automatic position to another position referred to as the manual position. In this position the analog position voltage from the converter 70 is disconnected from summing point 74 and the voltage from a potentiometer 88 is substituted therefore. Reference may be made to co-pending U.S. Patent Application Ser. No. 596,683, July 16, 1975, and assigned to the same assignee as the present application for a more complete description of the manual stitch length control system.

Referring now to the bight control system illustrated in FIG. 3, a switch 72' shown in the automatic mode position may be operated also in a manual position for connecting into the circuit a manual bight width control circuit 90. Switches 72' and 72 may comprise F.E.T. switches. In changing the switch 72' to the manual position, a potentiometer, indicated as the manual bight width control 90, is inserted into the circuit and acts as a scaling rheostat for the analog bight voltage from the converter 70° to provide any desired fraction of this invention at the summing point 74' and so provides convenient means for narrowing or altering the pattern.

As further shown in FIG. 3, output signals may be directed from a latch 92, which is set by each pulse received from the pulse generator 62, to provide an output on line 94 to the bight logic 60' and an output on line 96 to the feed logic 60. F.E.T. switches 98 may be used selectively to connect the bight logic 60' and the feed logic 60 to the output of a static programmable memory unit 100 or to the switch pattern read-only-memory 66 of the sewing machine. Preferably the switch 98 is a ganged switch comprising the individual switches 98 shown connected to the bight logic 60' and the feed logic 60 so that the switches will be simultaneously shifted from association with the ROM 66 to association with the programmable memory 100. The purpose of switching from the ROM 66 to the programmable unit 100 will be more clearly described hereinafter.

The programmable memory unit 100 is therefore compatible with the use of a stitch pattern read-only-memory unit 66 in a sewing machine in which the stitch position coordinate pattern data is electrically extracted and manipulated. The combination and selective use of the two types of memory devices disclosed herein provides a convenient means whereby operator generated switch patterns may be implemented while retaining in the machine the ability to select from a permanently stored memory those patterns which may be most frequently utilized.

As mentioned above, it is the purpose of the invention to provide a novel combination of a programmable memory with an electronic sewing machine in which the operator can visually generate patterns by drawing or the like for storage in a memory device which can be reproduced by sewing machine. For accomplishing this purpose a programmable memory 100 is provided for coupling to the sewing machine as through an electrical wire 102 having a plug (not shown) for connection to a socket 104 on the sewing machine. The socket 104 may include provision for actuating the switches 98 to disengage the ROM 66 and actively couple the programmable memory unit 100 to the machine. Also, electrical current may be supplied to the memory unit 100 from the machine which is connected to an alternating current source in a known manner.

Figure 2:
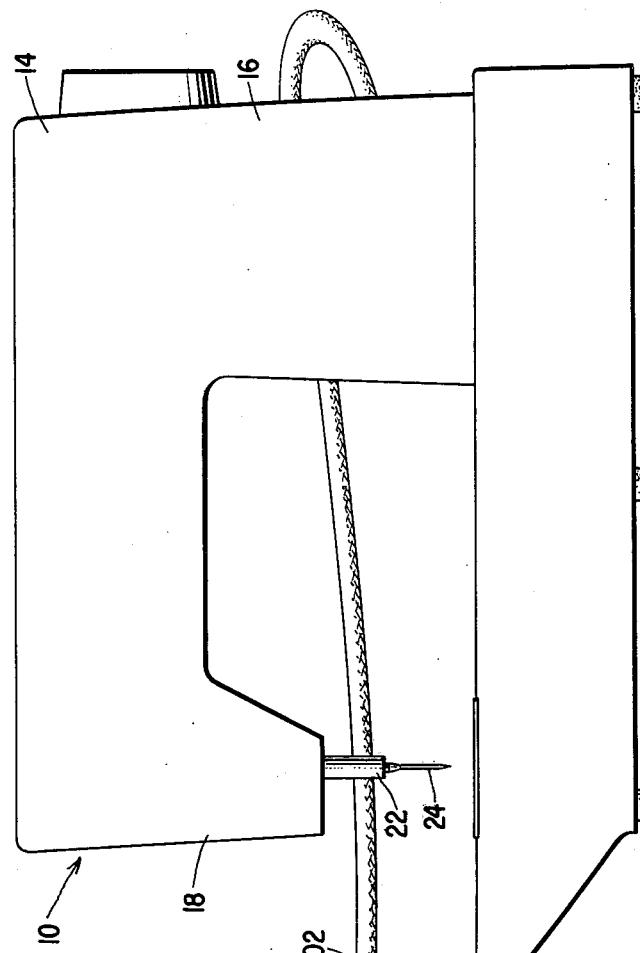
FIG. 2 is a view of a sewing machine and remote static programmable memory with the machine shown in front plan view and the memory shown in perspective view.
Figure 5:
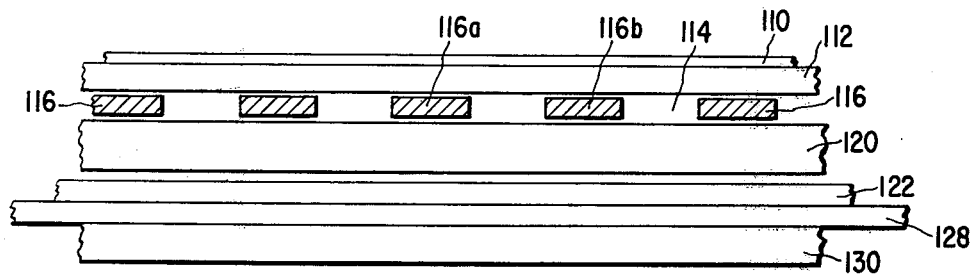
FIG. 5 is a sectional view of the programmer taken along line 5—5 of FIG. 2.
Figure 6:
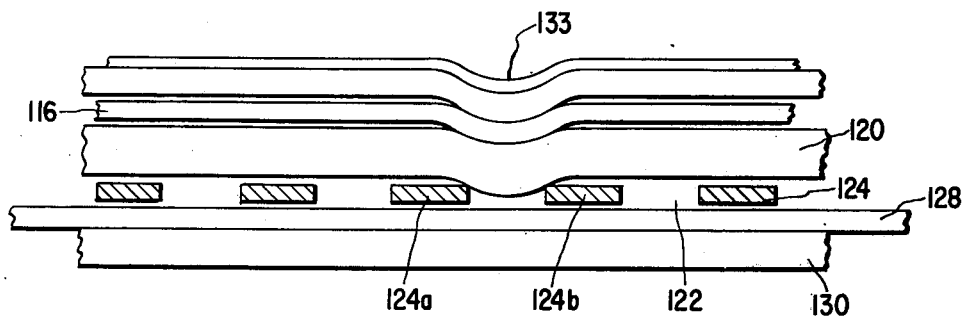
FIG. 6 is a sectional view of the programmer taken along line 6—6 of FIG. 2.
Figure 7:
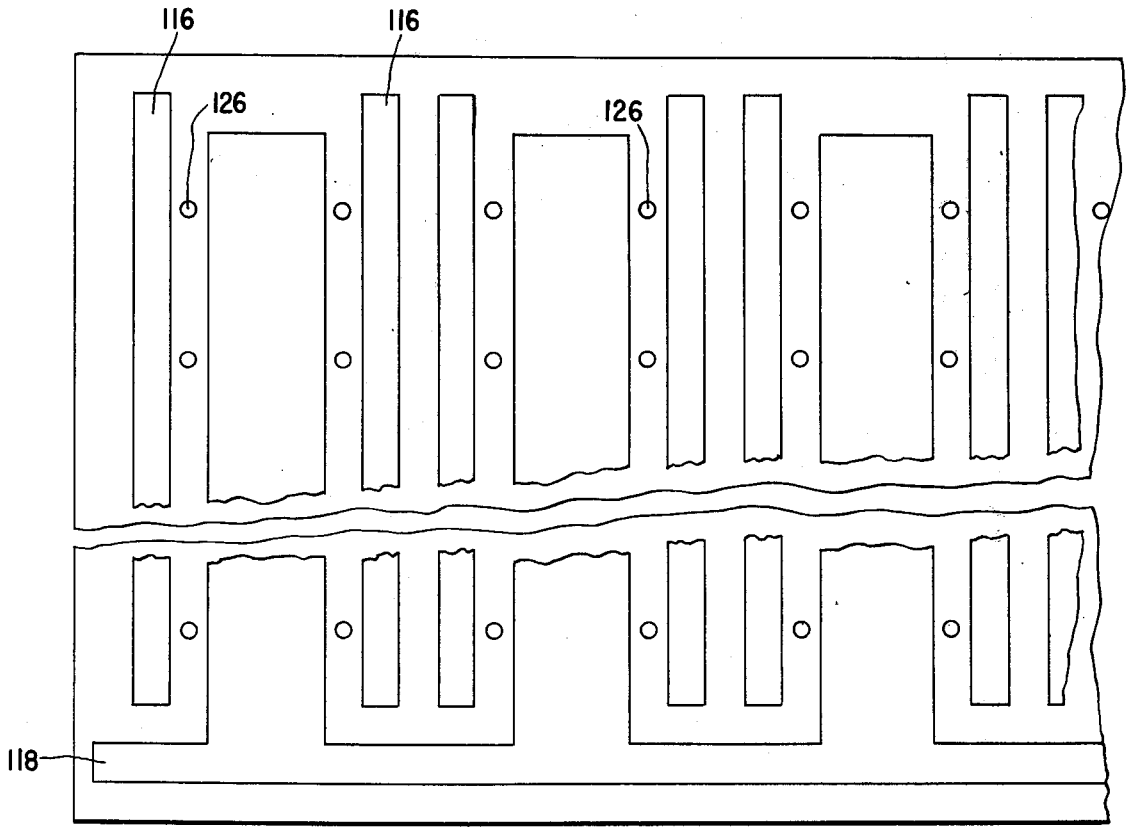
FIG. 7 is a top plan view of a programmer similar to that of FIG. 2 with the top section removed showing one level underneath the top in one section and a lower portion thereof in another section, and, FIG. 8 is a partial exploded view of the programmer of the invention.

Referring to FIG. 2, as shown therein the programmable memory 100 includes a reader or pattern generator comprising a housing 106 with an upper or top planar surface 108 which may have imprinted thereon a grid structure, as illustrated, or the grid structure may be formed on a removable or disposable surface such as a sketch paper 110 or the like. With particular reference to FIGS. 5, 6 and 7, supported immediately below the layer 110 and within housing 106 is a layer of insulating material 112 which material is flexible and may be made of a plastic material. The insulating layer 112 may also serve as the top surface of the housing 106 itself under a removable layer 110. Immediately below the insulating layer 112, a plate 114 is provided and is supported in the housing 106 in a stationary manner. The plate 114 comprises a printed circuit board upon which is printed a plurality of conductive switch bars or elements 116. The switch elements 116 are formed of a conductive material and are spaced along the circuit board or plate 114 in a manner which will produce discrete voltages in accordance with a pattern physically produced on the surface 110 as will be better understood hereinafter.

A common bus-bar structure 118 is provided for each group of switch elements and is arranged relative to the switch elements so that any pressure on aligned, adjacent switch elements 116 produces conduction between the associated common bus-bar structure 118 and an adjacent switch element 116. The bus-bar and switch alignment may take the form illustrated in FIG. 7, or in FIG. 8, and whose functions are substantially identical.

Supported immediately below the printed circuit board 114 and within the housing 106 is a layer of conductive plastic, pressure-sensitive material, which may be of the type known as DYNACON P. As shown in FIG. 6, a second printed circuit or plate 122 is supported in housing 106 below the conductive layer 120. The printed circuit board 122 is provided with a plurality of spaced switch elements 124 and bus-bars (not shown) such as is shown in FIG. 7 with respect to the printed circuit board 114 but having their orientation disposed at right angles or perpendicular to the orientation of the switch elements or bus-bars on the printed circuit board 114. (See FIG. 8). In order to properly align the two printed circuit boards 114 and 122 with respect to one another so that their switch bars are in an operative relationship with respect to each other a plurality of alignment points 126 (FIG. 7) are provided on each respective printed circuit board.

Figure 8:
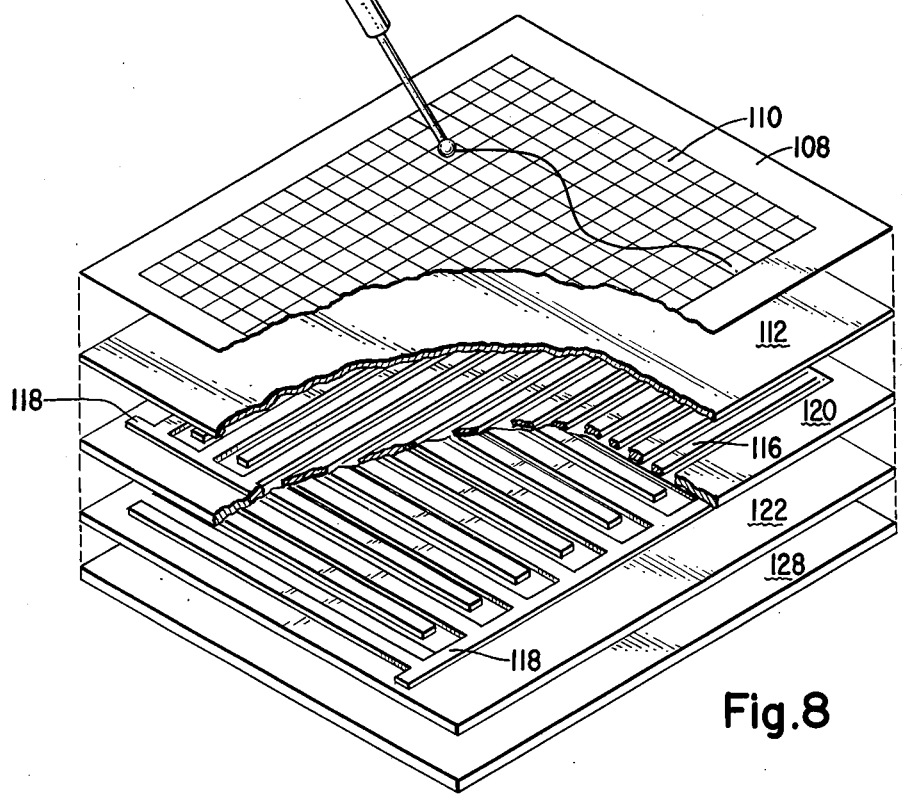

Below the printed circuit board 122, another insulating layer 128 is provided to insulate the conductive elements of the switching arrangement from the housing 106. As seen in FIGS. 5 and 6 the base of the housing 106 is represented at 130. With reference to FIG. 8, it is seen therein that the switch bar elements 116 of the printed circuit board 114 are arranged in one direction along one axis which may be termed the "Y" axis and the switch elements 124 of the printed circuit board 122 are arranged at right angles along an axis which may be termed an "X" axis. In generating a pattern the operator can draw a pattern on the surface 110 by means of a pencil or a stylus 132 or any other means through which a pressure can be exerted in a downward direction through the surface 110. As shown in FIG. 6, when a pressure is exerted as at point 133 along the surface 110, the upper layer 110 and the flexible insulating layer 112 will be bent downwardy. When this happens the adjacent switch elements 116A and 116B viewed in FIG. 5 will produce a conductive path in one direction between said switch elements through the conductive layer 120 and the common bus-bar 118 for that printed circuit board 114. Likewise, the pressure exerted at the point 133 will bring switch elements 124A and 124B into common conducting relationships with conductive layer 120 their associated bus-bar on the printed circuit board 122. As will be understood each of the printed circuit boards 114 and 122 has an electrical connection arranged so that, when particular switching elements are conducting a discrete voltage will be produced at that time. As the stylus is drawn across the upper surface 110 sequential voltage signals based on different combinations of switch elements 116 and 124 will be produced. In other words, as the stylus is moved the combination of "X" and "Y" voltages will change to provide discrete voltage signals each of which has a value corresponding to a stitch coordinate. The switching elements 116 and 124 are appropriately wired through their associated bus-bars for transmitting the voltage signals for appropriate use as will be more fully explained below.

Figure 4:
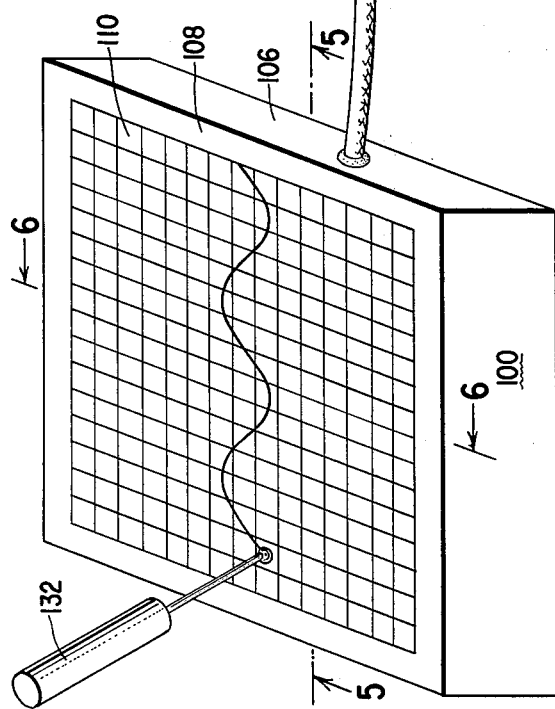
FIG. 4 is a schematic block diagram showing the components of the programmable memory device illustrated in FIG. 2 and their connection to a sewing machine actuator or control mechanism.
Figure 4:
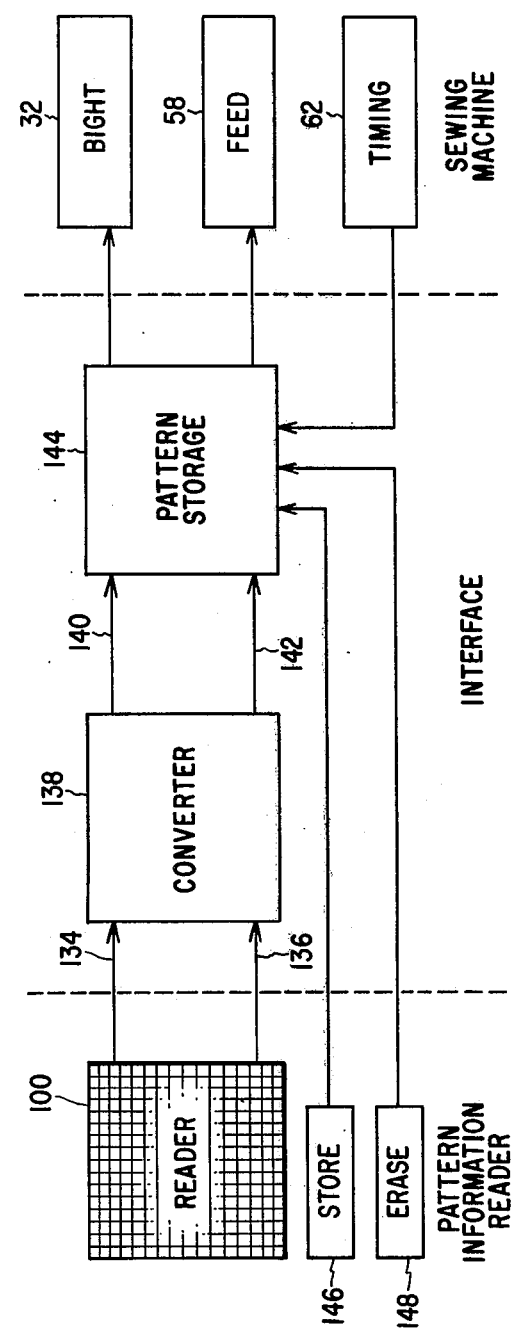

FIG. 4 illustrates in block diagram form the manner in which the voltages produced by the programmer 100 or reader may be utilized for operating the sewing machine to produce the selective patterns. When the sequential combinations of voltages are produced in the programmer or reader 100 as described above, the printed circuit board 114 will produce sequential voltage signals on the line 134 or "Y" signals which may be utilized as information for the bight portion of the pattern. Likewise. the sequential voltage signals produced from the printed circuit board 122 or "X" signals may output on line 136 and may be utilized for the feed information of the pattern. The sequential voltages are fed into a converter 138 which converter is of the type which will convert the analog voltage signals from the programmer 100 into digital form. Such a device is sometimes called an encoder. The digital information from the converter 138 has its output on lines 140 and 142 into a pattern storage or memory device 144 which is in the form of a random access memory. When addressed by the pulse generator or timing element, illustrated at 62 in FIG. 4, the digital information in the pattern storage 144 will be fed therefrom to the bight logic and actuator 32 and the feed logic and actuator 58, directly if said actuators are digitally operated devices or also through a digital to analog converter if the actuators are analog devices, as described above. Means are also provided for storing the information in the pattern storage or memory 144 for use at a later time and is represented by a store device 146 in FIG. 4. Also means are provided for erasing the memory as represented at 148 which erase mechanism may be of a well known type for electrically erasing information from a memory device. The electronic components namely converter 138, storage deice 144 and the store and erase elements 146 and 148 may be incorporated within the housing 106 or alternatively located within the machine frame 10. Also, the pattern storage device 144 may include a memory device, an encoder, appropriate latches and decoder, etc. as one or more Chips located in the housing 106 (not shown).

From the above description it will be seen that a novel combination is provided of a sewing machine and a programmable memory device wherein the operator can visually reproduce a desired pattern directly on the programmable memory device. Upon production of the pattern by the operator discrete sequential voltages are generated by the novel switching arrangement of the programmer which signals are converted to useable form for use by the electronic sewing machine in the manner described above. While the invention has been described in its preferred embodiment, it will be obvious that those skilled in the art that various changes and modifications may be made therein without departing from the spirit and scope thereof.

Having thus set forth the nature of the invention, what is claimed herein is:

1. In a sewing machine having stitch forming means operative to form successive stitches including mechanism for influencing the switch position coordinates of said successive stitches in the formation of a pattern of stitches, logic means responsive to input data representative of stitch position coordinates for producing stitch position coordinate electrical signals, actuating means responsive to signals from said logic means for controlling the position of said stitch forming means in accordance with input data fed to said logic means, and reprogrammable programming means operable connected with said sewing machine, said programming means being responsive to operator manipulation and including static memory means operative for storing digital input data corresponding to a stitch pattern selected by the operator and for transmitting electrical digital output signals to said logic means such that an operator may select a stitch pattern program for entry into the sewing machine for automatic reproduction of the switch pattern by the sewing machine and said programming means including a plurality of switching layers with each said layer being responsive when activated for producing voltage signals representative of input data of switch position coordinate information.

2. In a sewing machine as recited in claim 1 wherein each said switching layer includes a plurality of parallel spaced, conductive switching elements, with the switching elements of one of said layers being operative for producing input data representative of one portion of stitch position coordinate information and the other of said layers being operative for producing input data representative of a second portion of stitch position coordinate information.

3. In a sewing machine as recited in claim 2 wherein each of said switching layers is responsive to pressure exerted thereon for activating adjacent switching elements.

4. In a sewing machine as recited in claim 3 wherein said switching layers are contained in a housing, a flexible insulating layer disposed in close proximity to said switching layers and forming a top surface of said housing and including means for receiving a graphic representation of a stitch pattern thereon whereby an operator may depress said flexible insulating layer for activating said switching elements in accordance with a graphic representation of the stitch pattern thereby producing input data corresponding to the stitch pattern.

5. In a sewing machine as recited in claim 4 wherein the switching elements of said one layer are arranged substantially perpendicular with respect to the switching elements of said other layer.

6. In a sewing machine as recited in claim 5 wherein the switching elements of said one layer are operative for producing input data representative of the bight portions of the stitch position coordinates and said switching elements of said other layer are operative for producing input data representative of the feed portions of the stitch position coordinates.

7. In a sewing machine as recited in claim 6 wherein said programming means is disposed remote from said sewing machine and is operatively connected thereto.

8. In a sewing machine as recited in claim 1 wherein said programming means includes encoding means for converting the voltage signals from each said layer into digital form.

9. In a sewing machine as recited in claim 8 wherein said static memory means is connected to said encoding means for receiving digital signals therefrom and for storing said digital signals for use as input data to said logic means.

* * * * *

UNITED STATES PATENT OFFICE
CERTIFICATE OF CORRECTION

Patent No. 4,074,642     Dated February 21, 1978

Inventor(s) John A. Herr

It is certified that error appears in the above-identified patent and that said Letters Patent are hereby corrected as shown below:

Column 1, line 46, "re-programmble" should read -- re-programmable --

Column 5, line 17, "70°" should read -- 70' --

Column 6, line 60, "downwardy" should read -- downwardly --

Column 7, line 50, "deice" should read -- device --

Column 8, line 7, "switch" should read -- stitch --

Column 8, line 28, "switch" should read -- stitch --

Signed and Sealed this

Eleventh Day of July 1978

[SEAL]

Attest:

RUTH C. MASON
Attesting Officer

DONALD W. BANNER
Commissioner of Patents and Trademarks